United States Patent

Brighigna

[11] Patent Number: 5,083,544
[45] Date of Patent: Jan. 28, 1992

[54] COMPRESSION-IGNITION ENGINE, IN PARTICULAR FOR LIGHT AIRCRAFT

[76] Inventor: Mario Brighigna, Via Glovannina, 60, 44042 Cento Ferrara, Italy

[21] Appl. No.: 472,091

[22] Filed: Jan. 30, 1990

[30] Foreign Application Priority Data

Sep. 7, 1989 [IT] Italy .................. 3614A/89

[51] Int. Cl.$^5$ .................................. F02M 37/06
[52] U.S. Cl. ........................... 123/508; 123/507; 123/56 AC
[58] Field of Search .......... 123/507, 508, 509, 276, 123/56 AC, 372

[56] References Cited

U.S. PATENT DOCUMENTS

| | | | |
|---|---|---|---|
| 797,555 | 10/1904 | Carlson | 123/56 AC |
| 1,287,941 | 12/1918 | Flinn | 123/56 AC |
| 1,816,216 | 7/1931 | Ford | 123/56 AC |
| 1,882,896 | 10/1932 | Redmond | 123/508 |
| 2,111,828 | 3/1938 | Weaver | 123/56 AC |
| 4,164,913 | 8/1979 | Komiyama | 123/276 |
| 4,207,843 | 6/1980 | List et al. | 123/276 |
| 4,499,873 | 2/1985 | Lehner | 123/372 |
| 4,512,305 | 4/1985 | Pitozzi | 123/372 |
| 4,557,235 | 12/1985 | Amemori | 123/372 |
| 4,739,733 | 4/1988 | Hartmann et al. | 123/508 |
| 4,953,528 | 9/1990 | Oikawa | 123/276 |
| 4,995,362 | 2/1991 | Brighigna | 123/365 |

*Primary Examiner*—E. Rollins Cross
*Assistant Examiner*—Erick Solis

[57] ABSTRACT

The camshaft of the engine is located centrally and longitudinally in the crankcase, parallel to the crankshaft, and besides operating the valvegear, provides the drive for a fuel injection system of which the pump consists in a number of independent elements, one per cylinder, engaging directly with the camshaft at one end and connecting at the other with feed pipelines of identical length which are routed to injectors installed each with its nozzle end trained directly into the relative combustion chamber; formed in the piston crown, the chamber is designed with a cross-sectional profile of upturned omega shape, the effect of which being to create a rounded rim of smaller diameter than the remainder of the chamber, and with the base incorporating a centrally located bulge projecting back toward the head, a cavity of doughnut geometry materializes into which the fuel is injected directly.

14 Claims, 5 Drawing Sheets

COMPRESSION-IGNITION ENGINE, IN PARTICULAR FOR LIGHT AIRCRAFT

BACKGROUND OF THE INVENTION

The present invention relates to the architecture of internal combustion engines, and in particular of compression-ignition engines suitable for the propulsion of light aircraft.

Persons familiar with the design of aero engines know that a significant difference exists between the engines of small tourist or private aircraft and those of transport airplanes.

Aircraft used in transportation, whether passenger airliners or freight carriers, are almost without exception propelled by turbojet engines, of which the advantages in terms of power, range and fuel economy outstrip all other types of propulsion unit. Reciprocating engines, on the other hand, are by now limited to light aircraft (e.g. single- and twin-engined planes typically as used in tourism), their rated power being generally no higher than 400-500 HP; such planes are dependable, inexpensive to operate and well-established commercially, given that the basic design of the propulsion dates back to the prewar period.

The problem currently experienced with this second type of aircraft engine is simply that of procuring a constant and sure supply of fuel in all parts of the world; whereas jet aircraft utilize 'A1' fuel (by now universally available), the reciprocating engines of light aircraft can use only a special type of gasoline (a fuel formulated with particular properties, amongst which is the ability to resist freezing in significantly sub-zero temperatures). Owing to the enormous ascendancy of the jet engine in recent times, there has been a correspondingly enormous rise in the demand for A1 jet fuel at all airports, while gasoline has become increasingly scarce, often obtainable only at a high price and with no guarantees as to its quality.

Thus, an obvious contradiction exists between the growing demand for light aircraft propelled by low power reciprocating engines (which perform well for short and medium range flights as arranged by tour operators, and for private or executive use), and the limited availability of aero-engine gasoline. An additional factor now demanding consideration is the emergence, in recent automotive technology, of diesel engines that are substantially comparable in terms of power and dependability with conventional gasoline enginesg; such a situation could hardly have been foreseen at the time when gasoline aero engines were initially designed, developed and put into mass production. Moreover, in comparison to gasoline engines, diesels currently give a flatter power-torque curve (per unit displacement, needless to say) that is better suited to and exploitable at lower running speeds; this is precisely the case with aero engines, of which the speed of rotation is necessarily dictated by the required propeller speed, i.e. 2200 . . . 2600 rpm or thereabouts. Accordingly, the need is felt by the applicant to explore the notion of equipping light aircraft with reciprocating engines affording the same features of dependability and economy as the conventional aero units commissioned hitherto, but capable of operating on jet fuel, of which the availability, quality and rational cost are assured.

The object of the present invention is therefore to provide a reciprocating propulsion unit for light aircraft, exploiting diesel construction technology and adopting an architectural approach, as regards mechanical components and air intake, that permits of running the engine on jet fuel while maintaining the safety and reliability of conventional gasoline aero engines as used hitherto.

SUMMARY OF THE INVENTION

The stated object is realized, according to the invention, by adoption of an engine of which the architecture features a camshaft disposed centrally and longitudinally in the crankcase parallel to the crankshaft, constituting drive means by which the valve gear and fuel injection system are operated; the fuel system comprises single pumping elements each supplying a relative injector and engaging in contact at one end with the camshaft, and a set of pipes identical in length connecting the pumping elements and the corresponding injectors.

The nozzle of the single injector is directed into a combustion chamber exhibiting an upturned-omega profile, when viewed in cross section, of which the base presents a central bulge projecting back in the direction of the injector and serving to create an essentially toroidal cavity in direct receipt of the fuel sprayed by the injector; accordingly, the diameter at the rounded rim of the chamber, that is, the distance across the pinched section of the omega profile, is smaller than the overall diameter of the toroidal enclosure in which combustion takes place.

Among the advantages of the present invention is that it features a single centrally located shaft by which the valvegear and injection pump system are operated simultaneously, the effect being to give the engine a stable and efficient balance. In addition, the combustion produced by direct fuel injection is 'soft', thus enabling the avoidance of flexural and torsional vibrations through piston and crankshaft.

BRIEF DESCRIPTION OF THE DRAWINGS

The invention will now be described in detail, by way of example, with the aid of the accompanying drawings, in which.

DESCRIPTION OF THE PREFERRED EMBODIMENTS

The performance characteristics required of a diesel type engine in order to allow its adoption as an aero propulsion unit are dependability, compactness, limited weight and minimal crankshaft vibration. Thus, in designing the engine disclosed, the maximum consideration has of necessity been given to these requirements, departing from the selection of a combustion chamber geometry that will permit the use of jet engine fuel.

Figure 1:
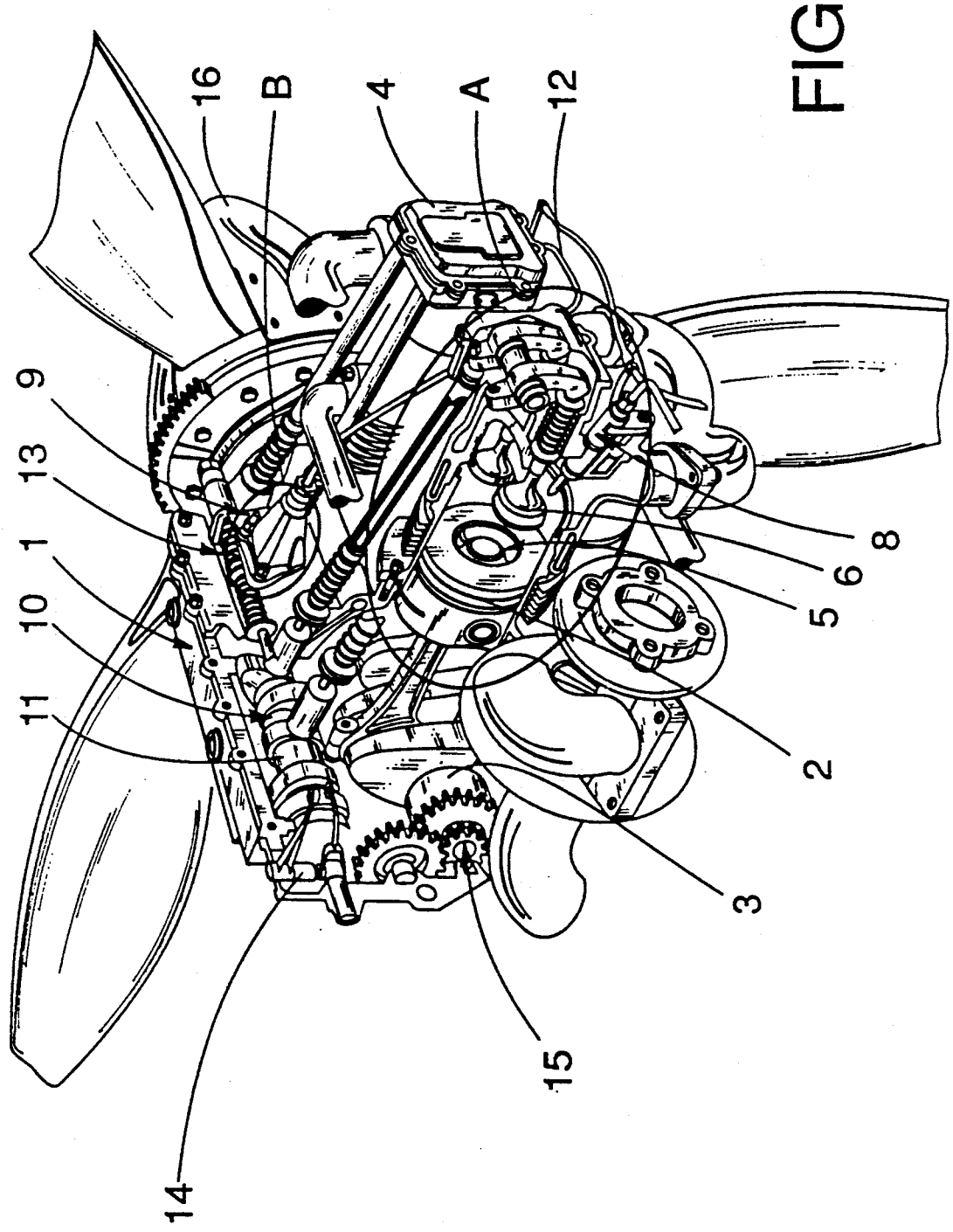
FIG. 1 is the perspective view of an aero engine according to the invention, seen with certain parts cut away.

As shown in the accompanying drawings, the engine disclosed comprises a crankcase and block assembly, denoted 1, accommodating a plurality of pistons 2; the example of FIG. 1 shows a 'flat' four cylinder embodiment (or 'boxer') in which two banks of two pistons stroke in opposition, reciprocating in timed sequence on either side of a crankshaft 3 located centrally in the crankcase 1 and carrying a propeller 16 keyed to one end. 4 denotes one of a plurality of cylinder heads corresponding in number to the pistons, located directly over and combining with the crankcase and blocks 1 to form a plurality of combustion chambers 5. Each head 4 accommodates and supports a pair of reciprocating valves 6 by which relative air inlet and gas exhaust ports 7 are opened and closed in sequence. Also carried by each head 4 is an injector 8, of which the nozzle end is directed into the respective combustion chamber 5 and the remaining end connected to a fuel pump system 9, to be described in due course. The injection pump system 9 is actuated by drive means, denoted 10 in their entirety, which operate in time with the pistons 2 in such a way that fuel is drawn from a tank (not illustrated) and supplied cyclically in metered quantities to the respective injectors 8.

More in detail, the drive means 10 consist in a multi-profile camshaft 11 occupying a central and longitudinal position internally of the crankcase 1 and located directly over and parallel with the crankshaft 3. The camshaft 11 is also connected in synchronous rotation with the crankshaft 3 at the end opposite that keyed to the propeller 16, by way of a train of three gears denoted 15, the number of components in the train being purposely limited in order to minimize vibration in both shafts.

The camshaft 11 thus operates both the valves 6 and the fuel injection pump system, which consists in a plurality of independently actuated elements 9 (see FIG. 1), one to each injector 8, arranged in two opposed banks; the four pump elements 9 engage in contact at one end with the camshaft 11, and are connected at the remaining end to pipelines 12 of identical length by which the fuel is carried to the relative injectors 8. This type of expedient, whereby the engine comprises a number of individual pumping elements (one to each cylinder, connecting with the relative injectors via essentially short pipes of identical length), and in which the method of injection is direct, is designed to eliminate pressure waves and resonances deriving from the hammering typical of conventional distribution type systems that utilize a single fuel pump connected to the injectors by pipes of dissimilar length. The pump elements 9 are associated further with control means 13 consisting in a pair of rods 13a and 13b (of which one only is visible in FIG. 1, the other being concealed by the crankcase 1) disposed on either side of and parallel with the camshaft 11 and connected to each of the pump elements 9 by way of means that are not central to the invention, and therefore not fully illustrated; at all events, the rods are invested with rectilinear movement, such that control of the pump elements 9 is synchronous and uniform. Such movement of the rods 13a and 13b is produced by a lever 14 disposed transversely to the two rods, pivoted at mid-point to and operated from externally of the crankcase 1; thus it becomes possible to meter the quantity of fuel supplied to the injectors 8 and maintain the setting prescribed for a given running speed of the engine.

Figure 2:
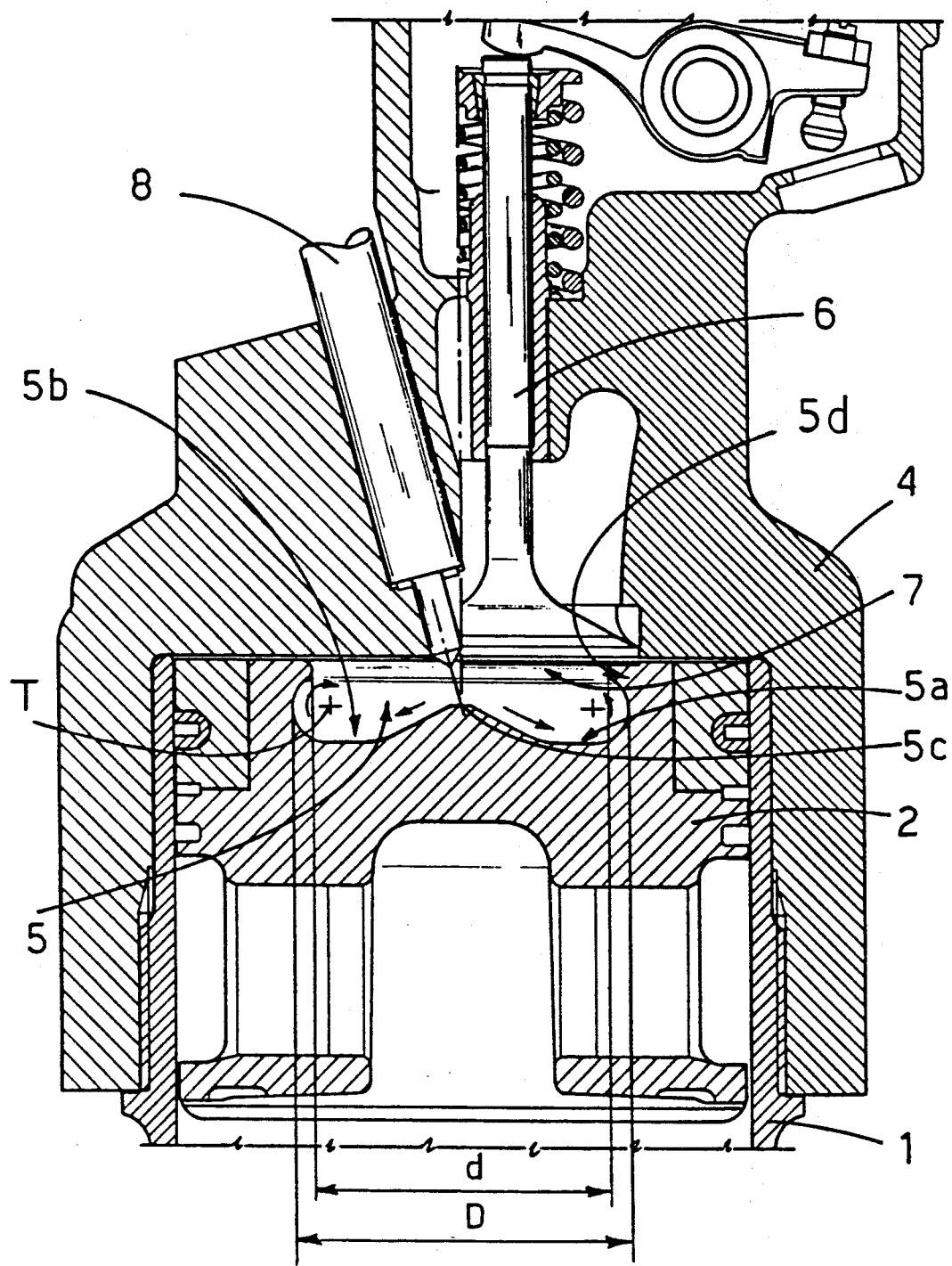
FIG. 2 illustrates the part of the engine of FIG. 1 denoted 'A', comprising one of the cylinders with the relative head and piston.

FIG. 2 illustrates the geometrical configuration of the combustion chamber in relation to the position of the injector 8, of which the nozzle penetrates directly into the chamber 5; more exactly, the combustion chamber is formed in the crown of the piston 2 (located either centrally, as illustrated, or offset), and exhibits an upturned-omega profile when seen in cross section. The omega profile also comprises a central bulge 5c (substantially conical when viewed three dimensionally), projecting from the bottom of the chamber 5 toward the injector 8 and creating a toroidal cavity 5b into which the fuel is jetted directly by the injector 8 from above (as seen in FIG. 2). The effect of the 'omega' is to create a combustion chamber 5 with a rolled rim 5d of diameter d smaller than the diameter D of the toroidal cavity; thus, the chamber is a genuine enclosure of doughnut embodiment which, during the compression stroke of the piston 2, will be capable of exploiting the injected fuel fully and enhancing turbulence of the aspirated air, in relation to the axis of the piston and to the axis T of the torus, as discernible from FIG. 2.

Figure 3:
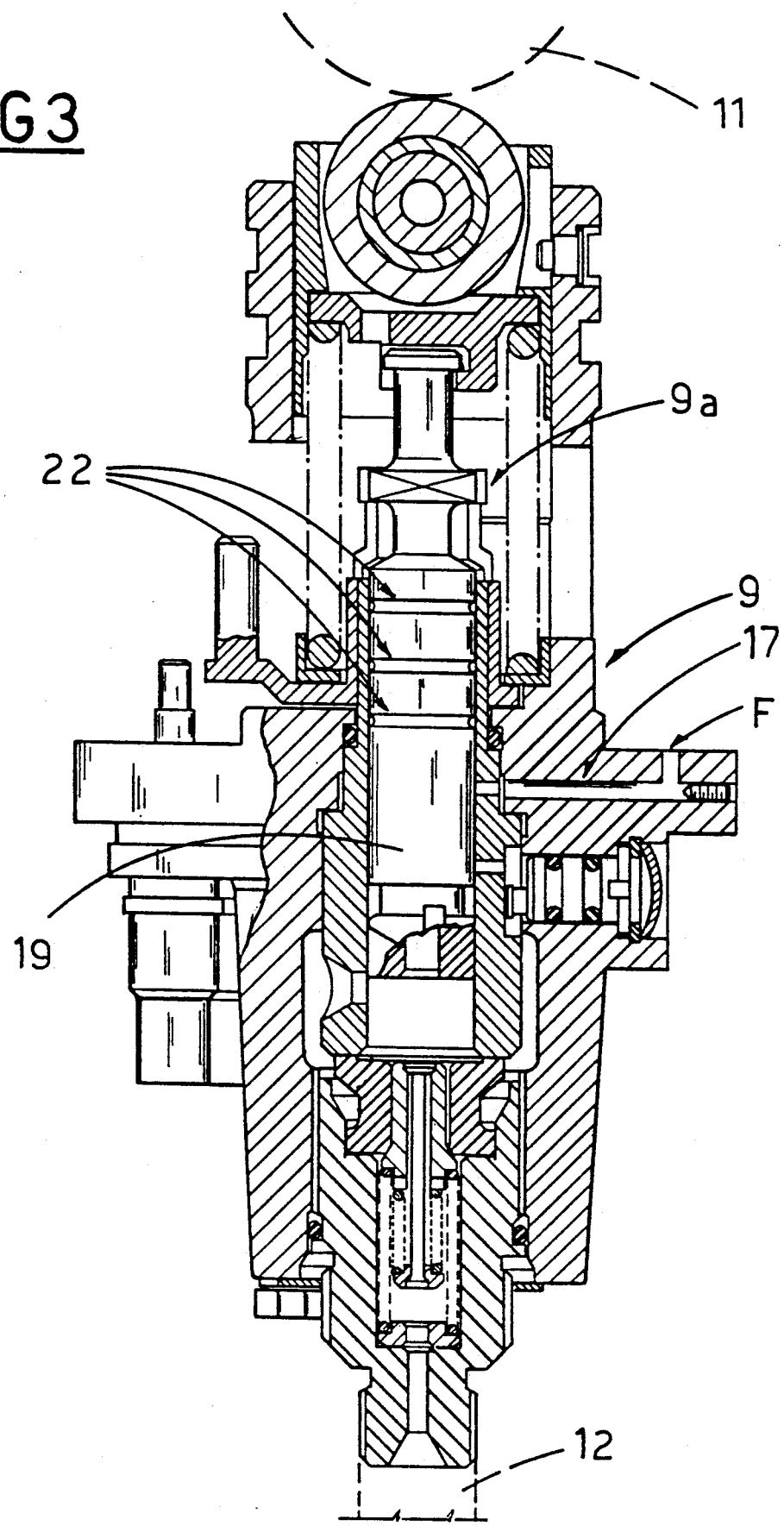
FIG. 3 is an illustration of the part of the engine of FIG. 1 denoted B, comprising one of the elements of the fuel injection pump system.

Accordingly, this same doughnut geometry enables notable combustion efficiency when using jet type fuel, as well as giving a considerable reduction in flexural and torsional vibration of the crankshaft (generated as combustion of the fuel occurs in the chamber 5); similarly, maximum combustion pressure values can be kept within limits (e.g. 1300 psi) such as allow a certain compactness of dimensions, which in turn signifies that the weight of the propulsion unit can be reduced substantially to match that of a conventional gasoline aero engine. By limiting maximum combustion pressure (hence the mechanical stresses attributable to combustion), one also gains the advantage of dispensing with a middle crankshaft bearing; the axial dimensions of the shaft can therefore be reduced, and compactness and weight of the engine improved yet further. As illustrated in FIG. 3, each of the fuel injection pump elements 9 is provided internally with a set of ducts 17 serving to carry lubricant, given that the jet fuel used by the engine disclosed cannot be exploited for lubrication purposes, as is generally the case with fuel oil. In the system shown, the lubricant is introduced into a first duct (see F) disposed parallel with a valve from which fuel is delivered to the injector 8, and then circulated through a set of further ducts 22 circumferentially encompassing a plunger 19 by which the pump action is effectively performed. On reaching the end of the circuit formed by the ducts 22, the lubricant is forced by controlled internal leakage to the part 9a of the pump element 9 in contact with the camshaft 11, before being returned to the main lubrication circuit (not illustrated); the part denoted 9a is totally immersed in lubricant.

Figure 4:
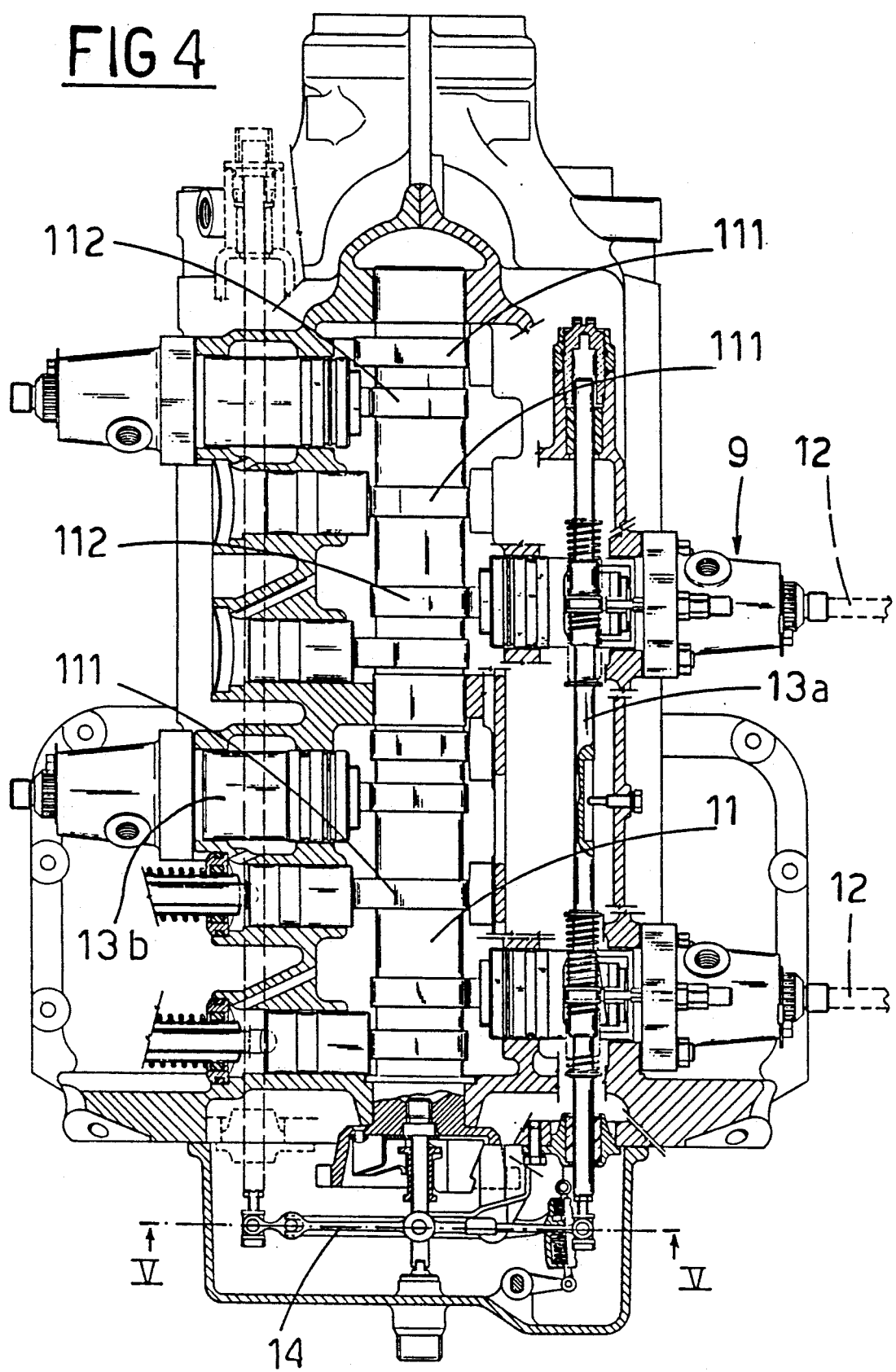
FIG. 4 is a section view of the motor along a camshaft axis.

FIG. 4 is a sectional view of the motor along the camshaft axis. It can be seen that the camshaft 11 is disposed longitudinally substantially centrally in the crankcase and includes a plurality of spaced cams 111 for the pistons together with a plurality of spaced cams 112 for the several fuel pump elements 9. In the preferred embodiment illustrated, two fuel pump elements 9 are located in a spaced manner on each side of the camshaft 11. A pair of rods 13a and 13b are disposed one on either side of and parallel to the camshaft 11. These rods are associated with the pump elements 9 of the fuel injection system in such a way that all of the pump elements are controlled simultaneously and uniformly by the movement of the rods. A lever 14 is disposed transversely of the rods 13a and 13b so as to engage one end of each of the rods. The lever 14 is pivoted at its midpoint to the crankcase and operates from outside the crankcase so that the rods can be invested with rectilinear motion.

Figure 5:
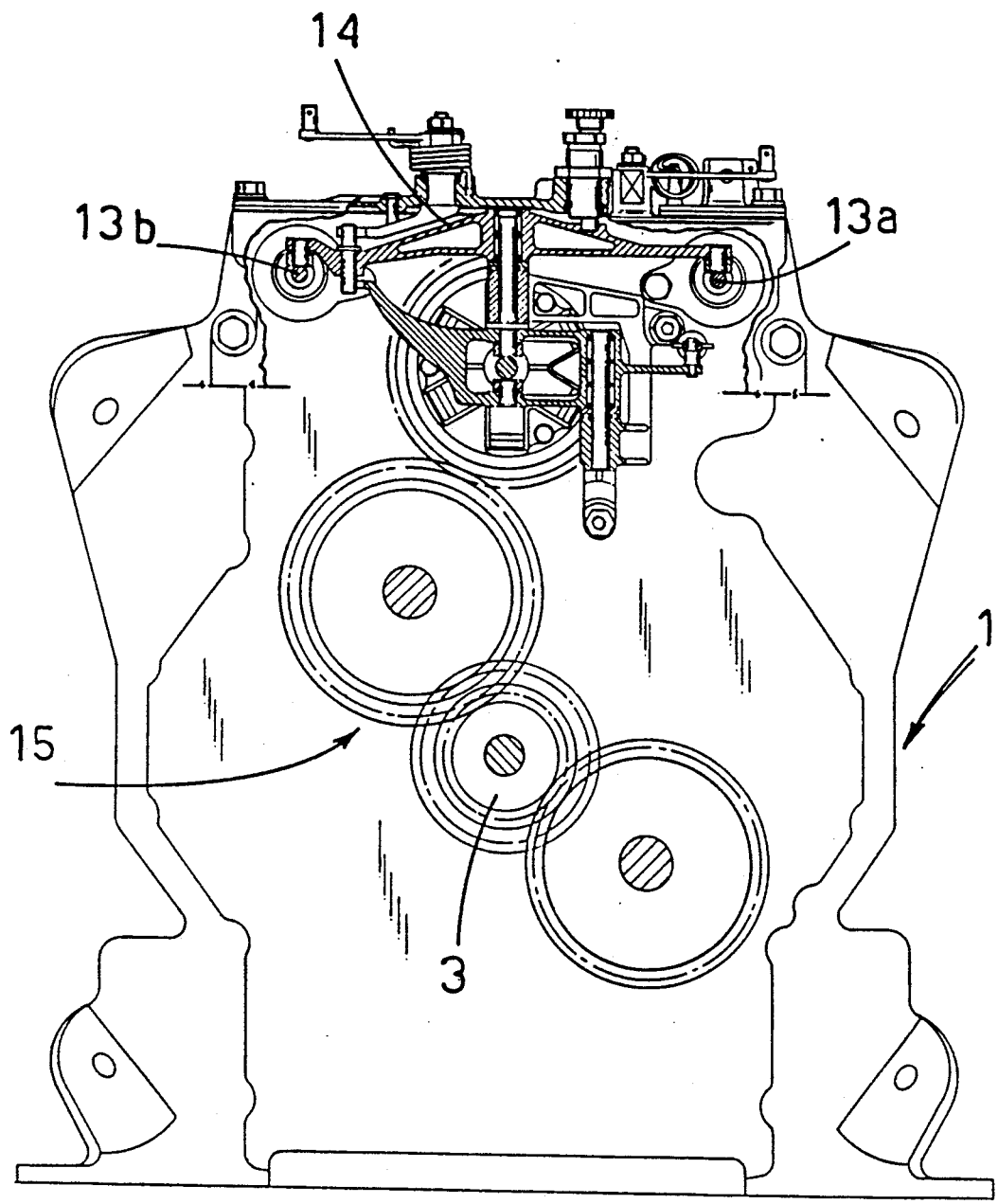
FIG. 5 is section view along line V-V of FIG. 4.

With reference now also to FIG. 5, a gear train 15 is utilized to time the rotation of the crankshaft 3 and the camshaft 11. FIG. 5 also shows an end view of the pair of rods 13a and 13b together with the lever 14.

Briefly then, the architecture of an engine thus described affords significant advantages from both structural and operational standpoints:

the toroidal shape of the combustion chamber, in combination with the injection system described, enables the use even of massive pistons with high efficiencies, the combustion produced being such that maximum pressures in the cylinder can be kept well contained (<1300 psi approx), and vibrations and stresses thus reduced throughout the entire propulsion unit;

the use of a single camshaft, driving the entire fuel injection pump system and valvegear, enables considerable reductions in space and weight;

with the adoption of a direct injection system in which each injector is served by an independent pumping element, high engine efficiency is obtained together with notable dependability; the system in question also gives a 'rounded' feel in operation, thanks to the elimination of resonances caused by hammering through the injector feed pipelines and pressure waves or elastic pulsations that disturb the regular injection pattern;

with the camshaft and crankshaft connected by way of a train of gears, minimal in number, mechanical trouble can be essentially precluded (by contrast, failure is frequent where belt drives are utilized) and crankshaft vibration markedly attenuated.

An engine embodied according to the invention thus features high efficiency and is light and compact; in addition, operation of the unit is markedly safe in view of the lower risk of structural vibration (in particular of crankshaft vibration) at normal running speed, an aspect of fundamental importance in aeronautical engineering.

What is claimed:

1. A compression-ignition engine, suitable in particular for the propulsion of light aircraft, comprising:
    a crankcase accommodating a plurality of pistons reciprocated in ordered sequence and connected to a crankshaft disposed centrally in the crankcase;
    a plurality of cylinder heads corresponding in number to the pistons, associated and combining with the crankcase to establish a plurality of combustion chambers, each formed in the crown of the relative piston, of which the cross-sectional profile exhibits the shape of an upturned omega and the base presents a central bulge projecting back in the direction of the injector in such a way as to create a toroidal cavity directly in receipt of the injected fuel, of which the overall diameter is greater than the diameter of the rounded rim of the chamber established by the geometry of the omega profile;
    a plurality of valves supported by the cylinder heads and invested with reciprocating motion to the end of opening and closing corresponding air inlet and gas exhaust ports;
    a fuel injection system, comprising a plurality of spaced pump elements, one for each of said plurality of cylinder heads, by which pump elements fuel is drawn from a tank and pumped through respective pipelines to a corresponding plurality of injectors, each injector being carried by a respective cylinder head with one end penetrating directly into the respective combustion chamber and the remaining end connected to the respective pipeline;
    means for driving both valves and the fuel injection system, said means for driving comprising one centrally located camshaft disposed longitudinally in the crankcase, parallel to the crankshaft and operating synchronously with the pistons, said camshaft comprising a plurality of spaced fuel pump cams by which one end of each of said spaced pump elements is engaged in direct contact.

2. An engine as in claim 1, comprising control means comprising a rod disposed parallel to the camshaft and associated with each of said pumps of the fuel injection system, in such a way that all of said pumps are controlled simultaneously and uniformly by its movement, and a lever disposed transversely to and engaging one end of the rod, pivoted centrally to and operated from outside the crankcase, by which the rod is invested with rectilinear motion.

3. An engine as in claim 1, wherein the camshaft is connected at one end to the corresponding end of the crankshaft by a train of three gears, in such a way as to enable synchronous operation of the inlet and exhaust valves, the fuel pumps and the pistons.

4. A compression-ignition engine, suitable in particular for the propulsion of ligh aircraft, comprising:
    a crankcase accommodating a plurality of pistons, connected to and reciprocated in ordered sequence in banks on either side of a crankshaft disposed centrally in the crankcase;
    a plurality of cylinder heads corresponding in number to the pistons, associated and combining with the crankcase to establish a plurality of combustion chambers, each formed in the crown of the respective piston, of which the cross-sectional profile exhibits the shape of an upturned omega and the base presents a central bulge projecting back in the direction of the injector in such a way as to create a toroidal cavity directly in receipt of the injected fuel, of which the overall diameter is greater than the diameter of the rounded rim of the chamber established by the geometry of the omega profile;
    a plurality of valves supported by the cylinder heads and invested with reciprocating motion to the end of opening and closing corresponding air inlet and gas exhaust ports;
    a fuel injection system, comprising a plurality of spaced pump elements, arranged in two opposed banks equidistant from the camshaft, one for each of said plurality of cylinder heads, by which pump elements fuel is drawn from a tank and pumped through pipelines of identical length to a corresponding plurality of injectors, each carried by a respective cylinder head with one end penetrating directly into the respective combustion chamber and the remaining end connected to the respective pipeline;
    control means for driving said fuel injection system, comprising two rods disposed one at either side of and parallel to the camshaft and associated with each of said spaced pump elements of the fuel injection system, in such a way that all of the spaced pump elements are controlled simultaneously and uniformly by their movement, and a lever disposed transversely to and engaging one end of the two rods, pivoted at mid-point to and operated from outside the crankcase, by which the rods are invested with rectilinear motion;

means for driving both the valves and the fuel injection system, said means for driving comprising one centrally located camshaft disposed longitudinally in the crankcase, parallel with and connected in timed rotation to the crankshaft by a train of three gears and operating synchronously with the pistons, by which one end of each of said spaced pump elements is engaged in direct contact.

5. An engine as in claim 1, wherein the combustion chamber is positioned centrally in relation to the piston.

6. An engine as in claim 4, wherein the combustion chamber is positioned centrally in relation to the piston.

7. An engine as in claim 1 wherein said respective pipelines through which fuel is pumped are of identical length to reduce resonances and vibrations.

8. A compression-ignition engine comprising:
a crankcase accommodating a plurality of pistons reciprocated in ordered sequence and connected to a crankshaft extending in said crankcase;
a plurality of cylinder heads corresponding in number to the pistons, said cylinder heads cooperating with said crankcase to establish a plurality of combustion chambers;
a fuel injection system comprising a plurality of spaced fuel pump elements, one being provided for each of said cylinder heads, said pump elements drawing fuel from a fuel tank and pumping the fuel through respective pipelines to a respective one of a plurality of spaced fuel injectors, one injector being provided for each of said cylinder heads; and,
a camshaft extending in said crankcase and spaced from said crankshaft, said camshaft including a plurality of longitudinally spaced fuel pump cams, one cooperating with a respective one of said plurality of spaced fuel pump elements.

9. The engine of claim 8 wherein said camshaft and said crankshaft extend longitudnally in said crankcase, with said crankshaft being disposed centrally in said crankcase.

10. The engine of claim 8 wherein said respective pipelines through which fuel is pumped are of identical length to reduce resonances and vibrations.

11. The engine of claim 8 further comprising a rod disposed parallel to said camshaft and associated with said plurality of fuel pumps so as to regulate a movement of said plurality of fuel pumps.

12. The engine of claim 8 further comprising a gear train for coupling said camshaft to said crankshaft, said gear train comprising three gears.

13. The engine of claim 8 wherein said crankshaft is centrally disposed in said crankcase and said pistons are located in banks on either side of said crankshaft so that they can be reciprocated in ordered sequence.

14. The engine of claim 13 further comprising a pair of rods disposed parallel to said camshaft with one on either side of said camshaft and wherein said plurality of fuel pumps are disposed in two ordered banks one on either side of said camshaft, each of said pair of rods being associated with a bank of said fuel pump elements so as to regulate a movement of said bank of fuel pump elements.

* * * * *

UNITED STATES PATENT AND TRADEMARK OFFICE
CERTIFICATE OF CORRECTION

PATENT NO. : 5,083,544
DATED : January 28, 1992
INVENTOR(S) : Mario Brighigna

It is certified that error appears in the above—identified patent and that said Letters Patent is hereby corrected as shown below:

Cover Page: Assignee: VM Motori, S.p.A.
[73] should be inserted Ferrara, Italy
after item [76]:

Cover Page: Inventor: Mario Brighigna,
[76] should read as Via Giovannina, 60
follows: 44042 Cento Ferrara, ITALY Signed and Sealed this Sixth Day of July, 1993

Attest:

MICHAEL K. KIRK

Attesting Officer     Acting Commissioner of Patents and Trademarks